(12) United States Patent
Ulbrich et al.

(10) Patent No.: US 10,823,585 B2
(45) Date of Patent: Nov. 3, 2020

(54) CONTACTLESS MOTION SENSOR FOR A MAGNETIC BEARING

(71) Applicant: Siemens Aktiengesellschaft, Munich (DE)

(72) Inventors: Benjamin Gottfried Ulbrich, Berlin (DE); Martin Wieschalla, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 147 days.

(21) Appl. No.: 16/075,076

(22) PCT Filed: Nov. 9, 2016

(86) PCT No.: PCT/EP2016/077141
§ 371 (c)(1),
(2) Date: Aug. 2, 2018

(87) PCT Pub. No.: WO2017/133799
PCT Pub. Date: Aug. 10, 2017

(65) Prior Publication Data
US 2019/0072413 A1     Mar. 7, 2019

(30) Foreign Application Priority Data
Feb. 3, 2016 (EP) .................................. 16154042

(51) Int. Cl.
*G01D 5/20*     (2006.01)

(52) U.S. Cl.
CPC ........... *G01D 5/202* (2013.01); *G01D 5/2053* (2013.01)

(58) Field of Classification Search
CPC .... G01D 11/245; G01D 5/202; G01D 5/2053; G01L 21/12; G01N 21/13;
(Continued)

(56) References Cited

U.S. PATENT DOCUMENTS

| 4,726,962 A | 2/1988 | Siemers et al. |
| 5,495,764 A * | 3/1996 | Matsuzaki .......... G01M 13/045 73/593 |

(Continued)

FOREIGN PATENT DOCUMENTS

| CN | 102893071 A | 1/2013 |
| DE | 112006003635 T5 | 11/2008 |

(Continued)

OTHER PUBLICATIONS

PCT International Search Report and Written Opinion of International Searching Authority dated Jan. 19, 2017 corresponding to PCT International Application No. PCT/EP2016/077141 filed Nov. 9, 2016.

*Primary Examiner* — Vinh P Nguyen
(74) *Attorney, Agent, or Firm* — Henry M. Feiereisen LLC

(57) ABSTRACT

A sensor apparatus for a magnetic bearing apparatus includes a motion sensor and a sensor ring which has the shape of a hollow cylinder and is intended to be connected to a shaft of an electrical rotating machine in a force-fitting manner, wherein the motion sensor is separated from the sensor ring by an air gap. In order to achieve a greater degree of reliability at high rotation speeds and ratings in comparison to the prior art, the sensor ring has a carrier ring composed of a first material and a sensor target composed of a second material.

22 Claims, 4 Drawing Sheets

(58) Field of Classification Search
CPC . G01R 33/0354; G01S 2013/468; H01B 1/00; H01F 6/06; H02N 1/002; H04Q 9/00; G01B 5/20; H02K 1/27; H02K 1/2706; H02K 1/2708
See application file for complete search history.

(56) References Cited

U.S. PATENT DOCUMENTS

| | | | |
|---|---|---|---|
| 6,849,979 B2 * | 2/2005 | Brunet | F16C 32/0446 |
| | | | 310/68 B |
| 8,167,499 B2 | 5/2012 | Taniguchi | |
| 9,841,294 B2 * | 12/2017 | Carrasco | G01D 5/14 |
| 2008/0258739 A1 * | 10/2008 | Niwa | G01D 3/02 |
| | | | 324/654 |
| 2009/0219017 A1 | 9/2009 | Mizuta | |
| 2009/0224752 A1 * | 9/2009 | Rakov | G01B 7/312 |
| | | | 324/207.25 |
| 2011/0267039 A1 | 11/2011 | Musselman et al. | |
| 2012/0126648 A1 | 5/2012 | Georgi et al. | |
| 2014/0346216 A1 * | 11/2014 | Rigal | B23K 20/021 |
| | | | 228/194 |
| 2015/0097457 A1 | 4/2015 | Kummlee | |

FOREIGN PATENT DOCUMENTS

| | | |
|---|---|---|
| EP | 1801545 A1 | 6/2007 |
| EP | 2887022 A1 | 6/2015 |
| RU | 2259265 C1 | 8/2005 |
| RU | 2504701 C2 | 1/2014 |
| RU | 2618570 C2 | 5/2017 |

* cited by examiner

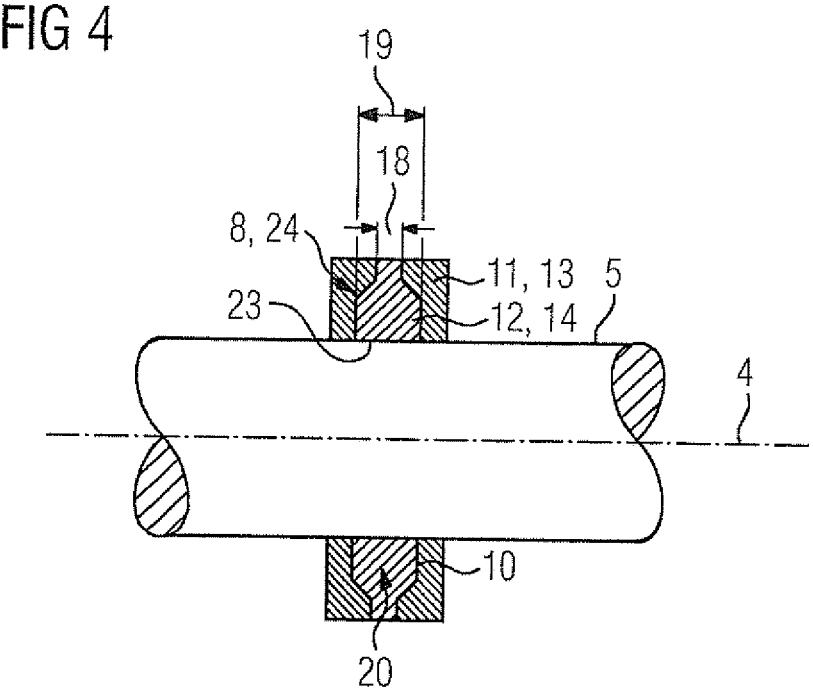
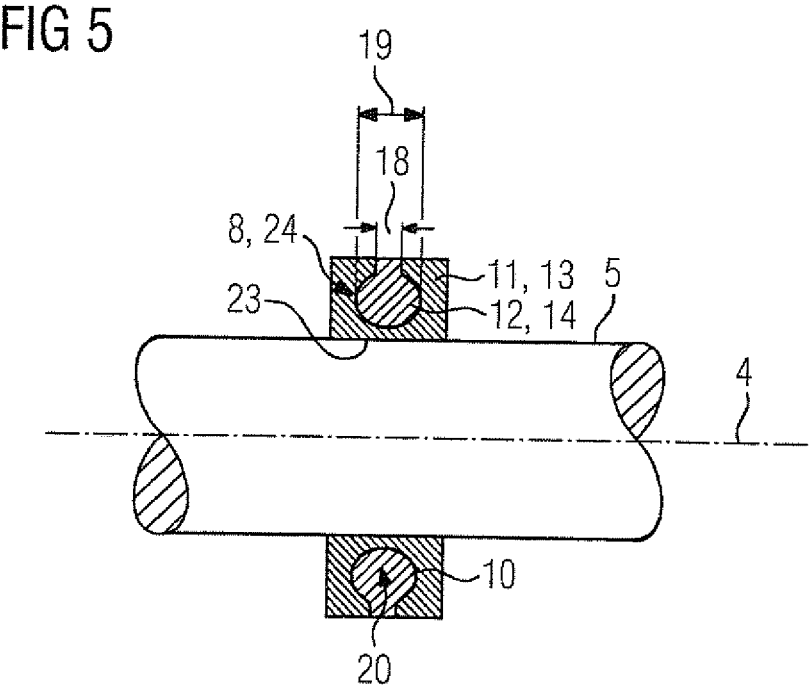

CONTACTLESS MOTION SENSOR FOR A MAGNETIC BEARING

CROSS-REFERENCES TO RELATED APPLICATIONS

This application is the U.S. National Stage of International Application No. PCT/EP2016/077141, filed Nov. 9, 2016, which designated the United States and has been published as International Publication No. WO 2017/133799 and which claims the priority of European Patent Application, Serial No. 16154042.2, filed Feb. 3, 2016, pursuant to 35 U.S.C. 119(a)-(d).

BACKGROUND OF THE INVENTION

The invention relates to a sensor apparatus for a magnetic bearing apparatus having a motion sensor and a sensor ring.

The invention furthermore relates to an electrical rotating machine having rotor that rotates about an axis of rotation, a stator surrounding the rotor and at least one magnetic bearing apparatus comprising at least one such sensor apparatus.

The invention further relates to a method for producing such a sensor apparatus.

Such a sensor apparatus for magnetic bearing apparatuses are preferably used in large-scale rapidly rotating electrical machinery with a rotational speed of at least 1000 rpm and a rating of at least 1 megawatt since rapidly rotating rotors with demanding rotor dynamics are increasingly mounted with active magnetic bearings.

With magnetic bearings, the position of the rotor is acquired during the rotation and the position of the rotor is regulated by exerting magnetic forces on the rotor thus minimizing displacement of the rotor in the magnetic bearing. The input variable for such control engineering is the position of the rotor, which is measured by means of contactless measurement on, for example, four uniformly distributed positions on the circumference, for example by means of an inductive motion sensor, also called an eddy current sensor. The quality of the measured sensor signal is directly responsible for the reliability of the control process and hence the performance of the magnetic bearing. During measurement of the sensor signal on a sensor target, particular significance is attached to the electrical run-out of the sensor target, which is, for example, influenced by material differences. Run-out is minimized by using materials with very low magnetic permeability as a sensor target on the rotor.

The sensor target is a so-called sensor ring, which is a solid hollow cylinder made of steel with the aforementioned properties. The sensor ring is produced separately from the rest of the rotor. During operation, the high rotational speeds and thermal load result in lift-off of the sensor ring during the operation of large-scale electrical rotating machinery and hence in a falsification of the sensor signal, which in this form can then lead to errors in the control.

The published patent application EP 2 887 022 A1 describes a sensor target for magnetic bearings comprising a ring-shaped assembly of magnetic material. The ring-shaped assembly is mounted on a generally ring-shaped assembly of non-magnetic material. The generally ring-shaped assembly of non-magnetic material comprises at least one ring-shaped slit and may be made of a cheaper material, for example aluminum. The ring-shaped slit provides flexibility which permits operation over a wide range of temperatures.

The invention is based on the object of disclosing a sensor apparatus for a magnetic bearing apparatus that has a higher degree of reliability at high rotational speeds and ratings compared to the prior art.

SUMMARY OF THE INVENTION

This object is achieved according to the invention by a sensor apparatus for a magnetic bearing apparatus having a motion sensor and a sensor ring, wherein the sensor ring has the shape of a hollow cylinder and is intended to be connected to a shaft of an electrical rotating machine in a force-fitting manner, wherein the motion sensor is separated from the sensor ring by an air gap, wherein the sensor ring has a carrier ring composed of a first material and a sensor target composed of a second material, wherein the second material of the sensor target has lower permeability and/or higher electrical conductivity than the first material of the carrier ring.

The motion sensor is, for example, an eddy current sensor, which has inductance and is suitable for measuring impedance, and preferably a change in impedance of the sensor target, on the sensor ring, via the air gap, in order, for example, to ascertain the spatial position of a shaft. The sensor target is, for example, used by the eddy current sensor for an impedance measurement. The carrier ring establishes, for example, a mechanical connection between the sensor target and a shaft that can also withstand loads at high rotational speeds.

This is advantageous since the different materials with preferably different mechanical and electrical properties enable separation of functions in a component. For example, the first material of the carrier ring increases the robustness of the sensor ring with respect to lift-off due to rotation and thermal loading and the second material has, for example, material properties that are optimal for the sensor technology. This achieves a high degree of reliability.

The second material of the sensor target has lower permeability and/or higher electrical conductivity than the first material of the carrier ring. For example, stainless steel and in particular austenite, aluminum, copper and brass are suitable as the second material for the sensor target.

The lower permeability and/or higher electrical conductivity of the first material result, for example, in lower fluctuations in conductivity and/or permeability, in particular on the surface of the sensor target. Such fluctuations due to tolerances, which are also called electrical run-out, cause a falsification of the measured sensor signal. Therefore, lower permeability and/or lower electrical conductivity of the second material compared to first material is advantageous.

The object is furthermore achieved by an electrical rotating machine having a rotor that rotates about an axis of rotation, a stator surrounding the rotor and at least one magnetic bearing apparatus, wherein the magnetic bearing apparatus has at least one such sensor apparatus.

The magnetic bearing, which is operated with such a sensor apparatus achieves very high efficiency of the electrical rotating machine with high reliability of the bearing, including at high rotational speeds and high ratings.

The object is furthermore achieved by a method for producing such a sensor apparatus, wherein, in a first step, the carrier ring is produced composed of a first material, wherein, in a following step, the sensor target, which is produced composed of a second material, is connected to the carrier ring to form a sensor ring.

This is advantageous since the different materials with preferably different mechanical and electrical properties can enable separation of functions in a component. This achieves a higher degree of reliability.

In one advantageous embodiment, the second material of the sensor target is connected to the first material of the carrier ring by a cohesive connection and/or positive-fitting connection. This is particularly advantageous, since a cohesive and/or positive-fitting connection is able to transmit high forces and torques. The space requirement, in particular for a cohesive connection, is very low. Consequently, the cohesive connection between the two materials is also reliable at high rotational speeds and high ratings.

In a further embodiment, the second material of the sensor target is connected to the first material on the radial outer side of the carrier ring. Consequently, the first material of the carrier ring is connected directly to the shaft in a force-fitting manner and, for example, increases the robustness of the sensor ring, while the second material, which, for example, has material properties that are optimal for the sensor technology, is positioned nearer to the motion sensor.

Advantageously, the carrier ring has a cavity on its radial outer side, wherein the cavity is filled with the second material of the sensor target. The cavity makes the connection of the second material of the sensor target to the first material of the carrier ring more stable.

In one advantageous embodiment, the width of the cavity tapers radially toward the outside. The tapering of the cavity produces a positive-fitting connection between the sensor target and the carrier ring. This is advantageous, since this positive engagement stabilizes the sensor target, for example, including in the case of high centrifugal forces.

In a further embodiment, the first material of the carrier ring has greater mechanical strength than the second material of the sensor target. Herein, mechanical strength should be understood to be the resistance of the first material to deformation and separation. This is advantageous since the greater mechanical strength of the first material of the carrier ring, which is, for example, connected to the shaft by means of a force-fitting connection, increases robustness of the sensor ring to lift-off, which can be caused by high rotational speeds and thermal loading. The higher robustness of the sensor ring reduces the probability of falsification of the measured sensor signals thus resulting in a high degree of reliability, in particular for the control.

In one advantageous embodiment, the first material of the carrier ring is a high-strength steel. As a result, the carrier ring provides, for example, the possibility of achieving much higher shrinkage excesses and hence significantly increasing robustness to lift-off due to rotation and thermal loading.

In a further embodiment, the second material of the sensor target is a paramagnetic stainless steel. A paramagnetic stainless steel is, for example, austenite. This is particularly advantageous since the low magnetic permeability achieves low electrical run-out.

In one advantageous embodiment, in the following step, the connection of the second material of the sensor target to the first material of the carrier ring is established by a cohesive connection. This is particularly advantageous since a cohesive connection has the strength required to satisfy the necessary mechanical and thermal requirements, for example at a rotational speed of at least 1000 rpm and a rating of at least 1 megawatt.

Advantageously, the cohesive connection is established by overlay welding or diffusion welding. In overlay welding, for example, the first material of the carrier ring is coated with the second material of the sensor target. In diffusion welding, for example, the first material and the second material are pressed together under high pressure and high temperature. Both methods are advantageous since they ensure the establishment of an optimal connection, in particular at higher temperatures, with less mixing.

In a further embodiment, during diffusion welding, nickel is used as the diffusion material. This is particularly advantageous, since nickel has been metallurgically proven to be a particularly suitable diffusion material for a stable connection.

In one advantageous embodiment, in the first step, the carrier ring is produced such that a cavity forms on its radial outer side, wherein, in the following step, the sensor target is inserted into the cavity and connected to the carrier ring. The cavity stabilizes the connection of the second material of the sensor target to the first material of the carrier ring.

BRIEF DESCRIPTION OF THE DRAWING

The following describes and explains the invention in more detail with reference to the exemplary embodiments depicted in the figures.

The figures show in.

DETAILED DESCRIPTION OF PREFERRED EMBODIMENTS

Figure 1:
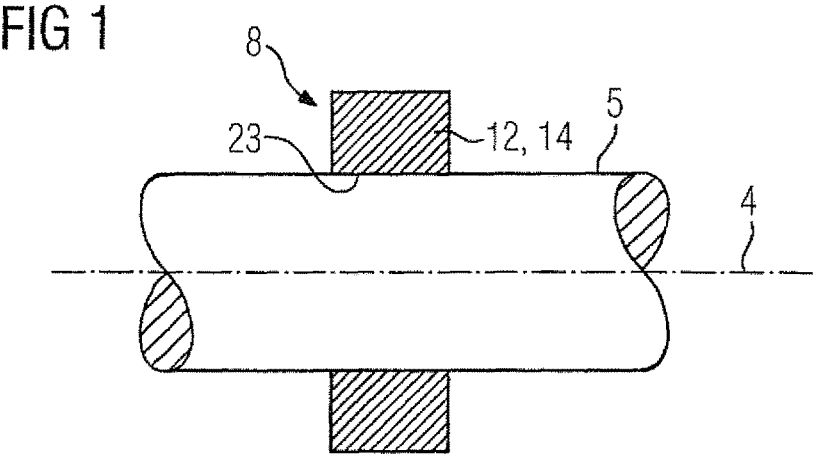
FIG. 1 a longitudinal section of a shaft with a sensor ring.

FIG. 1 shows a longitudinal section of a shaft 5 with a sensor ring 8. The shaft 5 with the sensor ring 8, which is mounted with active magnetic bearings, is provided for a rotor with demanding rotor dynamics, wherein the demanding rotor dynamics occur on the operation of an electrical rotating machine with a rotational speed of at least 1000 rpm and a rating of at least 1 megawatt.

With magnetic bearing of the shaft 5, the position of the shaft 5 is detected, wherein magnetic forces are exerted onto the shaft 5 thus minimizing the displacement of the shaft 5 in the magnetic bearing. The input variable for such control engineering is the position of the shaft 5, which is measured at several, preferably uniformly distributed positions, with a motion sensor, for example an eddy current sensor. The quality of the measuring signal has a direct and decisive influence on the control process and performance of the magnetic bearing. Herein, the sensor ring 8 functions in a sensor apparatus as sensor target 12 for the motion sensor and is embodied such that its outer radial surface is virtually equidistant to the axis of rotation 4 over the entire circumference. The measurement is influenced by deviations from the ideal circular shape of the measuring plane, the mechanical run-out, and, due to residual magnetism and/or material differences, the electrical run-out. Such mechanical and/or electrical deviations simulate displacement of the shaft 5. Hence, the deviations named must not exceed specific values.

At the sensor ring 8, the electrical run-out of the sensor target 12, which is, for example, influenced by material differences, is of particular significance, since, with low electrical run-out, the probability of erroneous measurement during control is minimized. This is minimized by using a material with very low magnetic permeability as a sensor target 12 on the shaft 5.

The sensor ring 8 in FIG. 1 is composed of a second material 14. The second material 14 is a material with very homogeneous electrical and magnetic properties, preferably a paramagnetic stainless steel, in particular austenite. In particular, the low magnetic permeability achieves very low electrical run-out.

The inner side of the rotationally symmetrical sensor ring is connected in a rotationally fixed manner by means of a force-fitting connection 23 to the outer side of the shaft 5 that can be rotated about an axis of rotation. The force-fit between the sensor ring 8 and the shaft 5 is achieved by means of a shrink-fit connection.

With such a shrink-fit connection, the sensor ring 8 is, for example, heated by a few hundred degrees Celsius thus causing the inside diameter of the sensor ring 8 to enlarge as a result of thermal expansion. In the heated state, the sensor ring 8 that has enlarged due to the thermal expansion is pulled over the shaft 5, which is made of steel and has a slightly smaller outer diameter than the inside diameter of the heat sensor ring 8. On cooling of the sensor ring 8, heat shrinkage, also called thermal contraction, takes place as a result of which the sensor ring 8 recovers its former size and is mechanically fixed to the shaft 5.

The second material 14 of the sensor ring 8 has relatively low values for the yield point and thus the excess, and hence robustness to lift-off of the sensor ring 8 during operation, is low. The same applies to sensitivity in respect of lift-off due to thermal loading and due to the thermal expansion that occurs.

Figure 2:
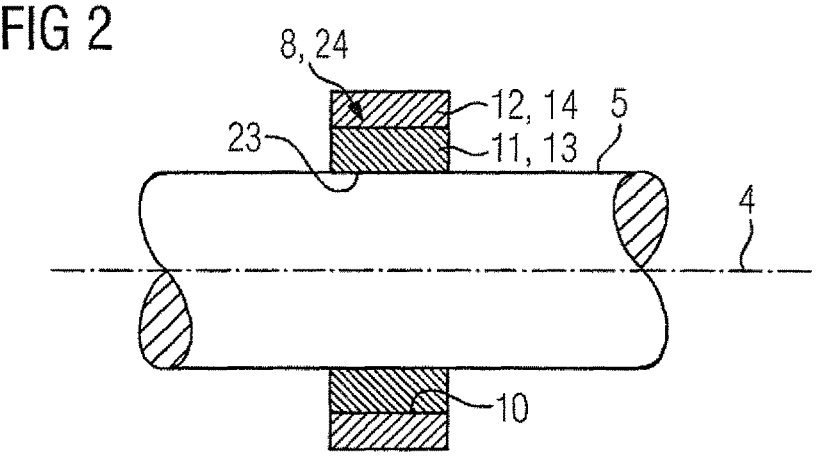
FIG. 2 a longitudinal section of a shaft with a first embodiment of a composite sensor ring, FIG. 3 a longitudinal section of a shaft with a second embodiment of a composite sensor ring, FIG. 4 a longitudinal section of a shaft with a third embodiment of a composite sensor ring, FIG. 5 a longitudinal section of a shaft with a fourth embodiment of a composite sensor ring, FIG. 6 a three-dimensional sectional view of a sensor apparatus with a composite sensor ring, FIG. 7 a longitudinal section of a sensor apparatus with a composite sensor ring and FIG. 8 an electrical rotating machine.

FIG. 2 shows a longitudinal section of a shaft 5 with a first embodiment of a composite sensor ring 24. Such a composite sensor ring 24 is a sensor ring 8, which is made up of a plurality of elements 11, 12, which preferably consists of different materials 13, 14. The remaining structure corresponds to that in FIG. 1.

The different elements 11, 12 separate the functions of the sensor ring 8. The sensor ring 8 is produced from a carrier ring 11 and a sensor target 12, which is composed of the second material 14 described in FIG. 1. Consequently, the sensor target 12 applied to the outer side of the sensor ring 8 provides the advantages of low electrical run-out. The carrier ring 11 is produced composed of a first material 13, a very solid and weldable material. It carries the sensor target 12 on its outer side and is connected in a force-fitting manner to the shaft 5 on its inner side. The first material is preferably a high-strength steel, which provides the possibility of achieving significantly increased shrink excesses and hence of significantly increasing robustness to lift-off due to rotation and thermal loading.

The second material 14 of the sensor target 12 is connected to the first material 13 by means of a cohesive connection 10 on the radial outer side of the carrier ring 11. The cohesive connection 10 is established by overlay welding or diffusion welding.

Figure 3:
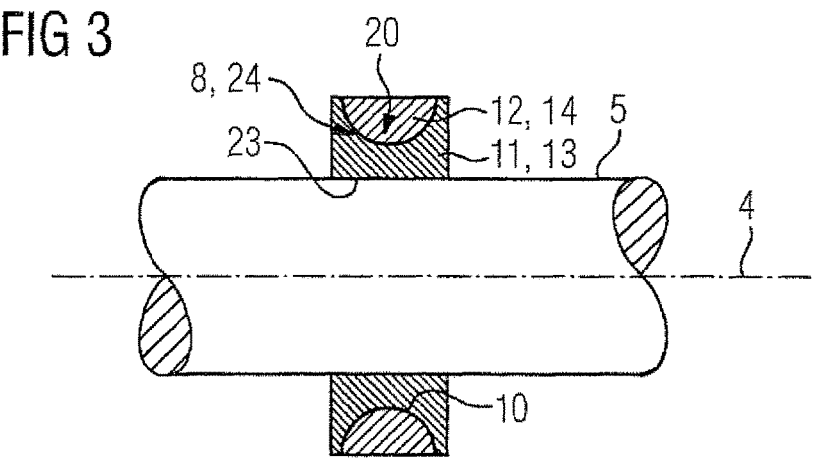

FIG. 3 shows a longitudinal section of a shaft 5 with a second embodiment of a composite sensor ring 24, wherein the carrier ring 11 has a cavity 20 on the radial outer side in which the second material 14 of the sensor target 12 is located. The carrier ring 11 with the sensor target 12 has the shape of a hollow cylinder and is connected to the shaft 5 in a rotationally fixed manner by means of the carrier ring 11. The remaining structure corresponds to that in FIG. 2. There is a cohesive connection 10, established by overlay welding or diffusion welding, between the carrier ring 11 and the sensor target 12.

The cavity 20 in the carrier ring 11, which is filled with the second material 14 of the sensor target 12, is round, but may also have corners. The cavity 20, as a result of which the sensor target 12 has a larger contact area with the carrier ring 11, increases the stability and robustness of the cohesive connection between the first material 13 and the second material 14 and hence also prevents lift-off of the sensor target 12.

FIG. 4 shows a longitudinal section of a shaft 5 with a third embodiment of a composite sensor ring 24, wherein the carrier ring 11 has a cavity 20, which is filled with the second material 14 of the sensor target 12 and wherein the axial width of the cavity 20 tapers in in the radial direction toward the outside. The remaining structure corresponds to that in FIG. 3. Additionally to the cohesive connection 10, the tapering of cavity results in a positive-fitting connection between the carrier ring 11 and the sensor target 12. This is advantageous, since this positive engagement additionally stabilizes the sensor target 12 in the case of high centrifugal forces.

The cavity 10 in FIG. 4 is embodied such that, in addition to the carrier ring 11, the sensor target 12 is also mechanically connected to the shaft 5. The force-fitting connection 23 of the sensor ring 8 to the shaft 5 is formed at least by the carrier ring 11.

FIG. 5 shows a longitudinal section of a shaft 5 with a fourth embodiment of a composite sensor ring 24. Compared to FIG. 4, the cavity 20 of the carrier ring 11 is, rounded and tapers continuously. The carrier ring is connected to the shaft 5 in a force-fitting manner. The remaining structure corresponds to that in FIG. 4.

Figure 6:
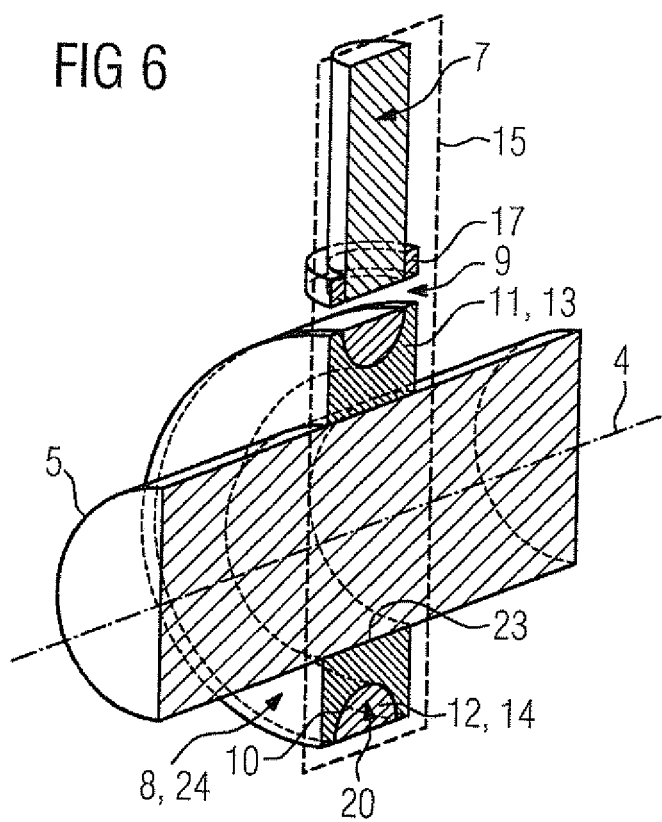

FIG. 6 shows a three-dimensional sectional view of a sensor apparatus 15 with a composite sensor ring 24. The composite sensor ring 24, which as in FIG. 3 is exemplary only, is connected to the shaft 5 in a force-fitting manner. A motion sensor 7, which is embodied as an eddy current sensor, is located, separated by an air gap 9, above the sensor target 12. The motion sensor 7 is intended to measure a change in the distance to the rotating composite sensor ring 24 and hence to the rotating shaft 5 in a contact-free manner.

Figure 7:
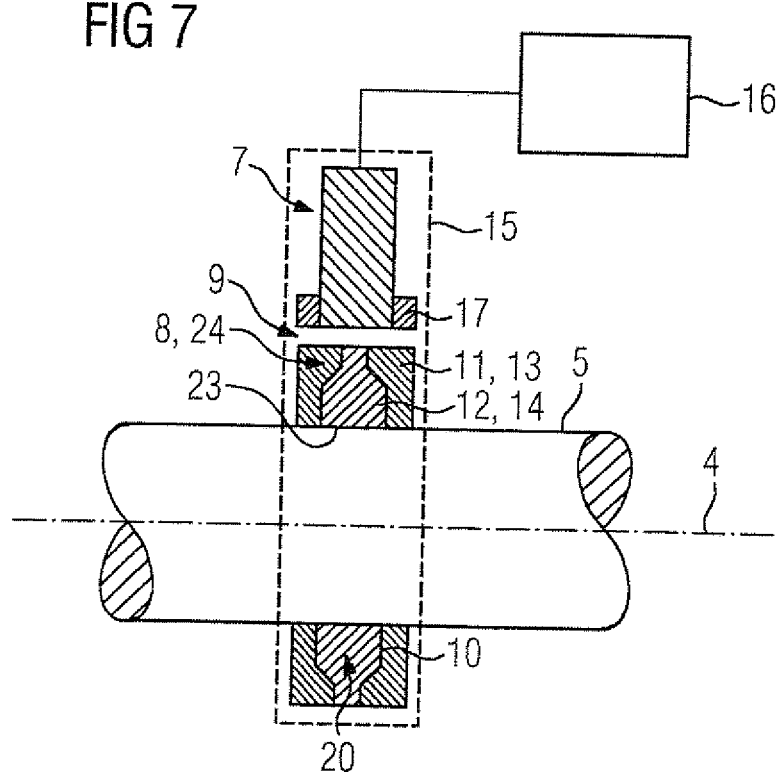

FIG. 7 shows a longitudinal section of a sensor apparatus 15 with a composite sensor ring 24, which as in FIG. 4 is exemplary only. The remaining structure of the sensor apparatus 15 corresponds to that in FIG. 6. The motion sensor 7 embodied as an eddy current sensor is supplied by an AC signal and generates, through the coil 17, an electromagnetic AC field, which induces eddy currents in the rotating sensor target 12. An evaluation device 16, which is connected to the motion sensor 7, measures the impedance of the coil 17. The impedance is influenced by the eddy currents induced in the sensor target 12, the amount and phase of which are determined by the size of the air gap 9.

A change in the distance between the sensor ring 8, and hence the shaft 5 and the motion sensor 7, is measured from the change in the impedance of the coil 17. The change in impedance is acquired and evaluated as a change in amplitude and/or phase. The evaluation device 16 outputs an analog current signal or voltage signal proportional to the distance, which is suitable as an input variable for the control engineering of a magnetic bearing. The control engineering and the magnetic bearing are not shown for reasons of clarity.

The measurement of the change in impedance is influenced by deviations from the ideal circular shape of the sensor ring 8, wherein such a deviation is described as mechanical run-out. Furthermore, such eddy-current measuring methods are associated with known measuring effects, which are based on fluctuations in the conductivity or permeability primarily in the surface of the sensor target 12 and are described as electrical run-out.

Consequently, the sensor target 12 is composed of a material with very homogeneous electrical, and in particular magnetic, properties, for example an austenitic stainless steel with paramagnetic properties. The carrier ring 11 composed of the first material 13 is made of a very strong and weldable material, for example a hard steel, which is suitable for bearing the sensor target 12 even in the case of high centrifugal forces. Furthermore, the steel used for the carrier ring is suitable for achieving high shrinkage excesses of more than 100 μm in order to remain connected to the shaft 5 in a rotationally fixed manner, even in the case of high centrifugal forces and high thermal loads.

Figure 8:
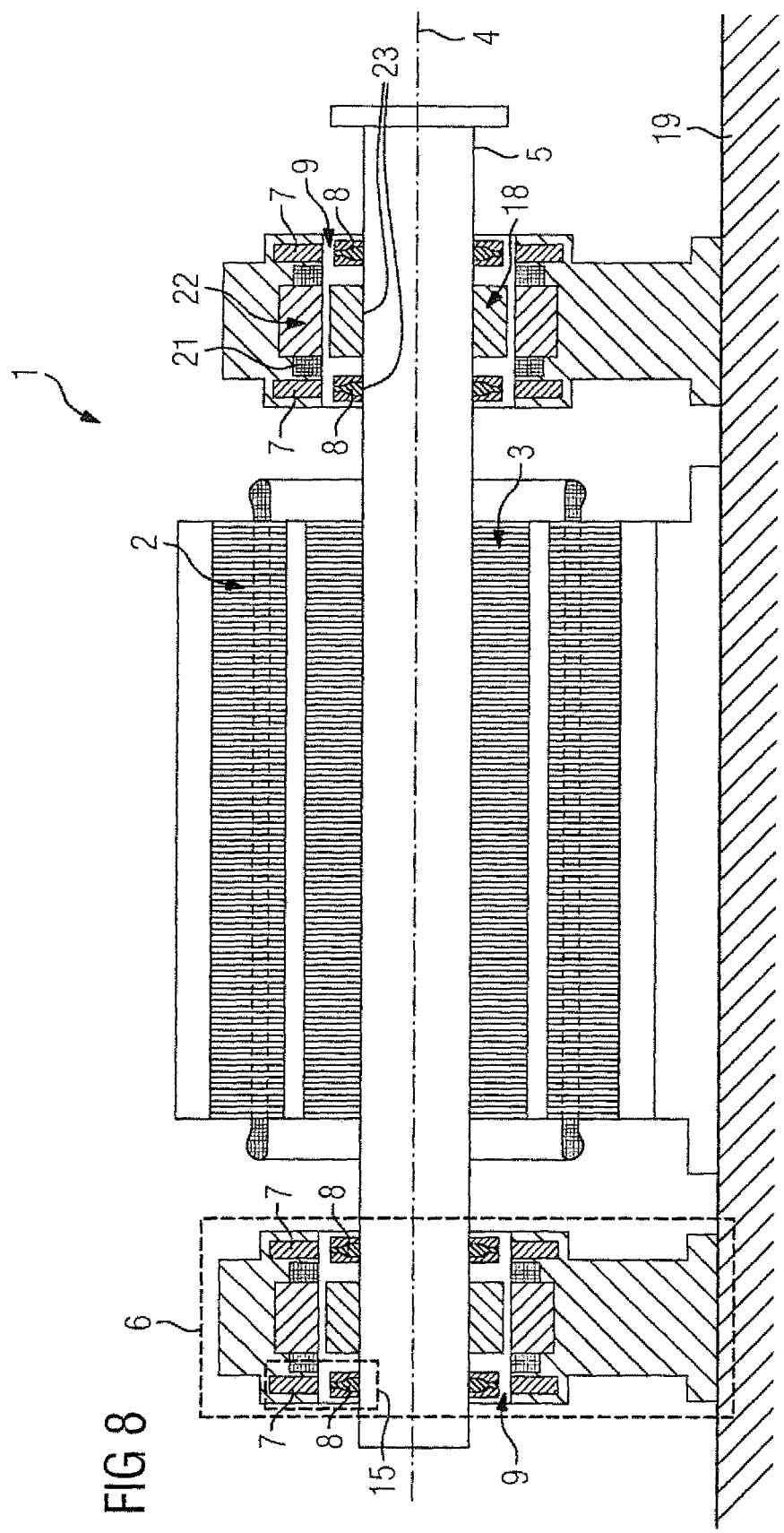

FIG. 8 shows an electrical rotating machine 1 standing on a base 19. The electrical rotating machine 1 comprises a rotor 3 that can be rotated about an axis of rotation 4 and a stator 2 surrounding the rotor 3. The shaft 5 of the rotor is mounted in a contactless manner on both axial ends in each case by an active magnetic bearing apparatus 6.

An active magnetic bearing apparatus 6 comprises a magnetic bearing rotor 18, which is connected to the shaft 5 by means of a force-fitting connection 23, and an electromagnet 22 surrounding the magnetic bearing rotor 18. The electromagnet 22 comprises coils 21, which are supplied by a direct current and generate a constant magnetic field. Moreover, in addition to the electromagnet 22, it is possible to use a permanent magnet to generate the constant magnetic field. The constant magnetic field causes the shaft 5 to be held approximately in the center of the electromagnet 22 and to be mounted magnetically in a virtually frictionless manner.

In order to be able to ascertain the location of the shaft 5 with the magnetic bearing rotor 18 in the magnetic field of the electromagnet 22, at least four sensor apparatuses 15 embodied as shown in FIG. 6 and FIG. 7 are arranged at uniformly distributed positions around the circumference of the shaft 5. The sensor apparatuses 15 are intended to ascertain the position of the shaft 5 of the rotor 3 in the radial plane and comprise a motion sensor 7 and a sensor ring 8, which is embodied as a composite sensor ring 24. The magnetic bearing apparatus 6 is embodied by way of example as a radial bearing. A use of the sensor apparatus 15 for an axial bearing is also subject matter of the patent application, wherein in the case of an axial bearing, the sensor apparatus 15 is intended to ascertain the position of the shaft 5 in the axial direction.

To summarize: the invention relates to a sensor apparatus 15 for a magnetic bearing apparatus 6 having a motion sensor 7 and a sensor ring 8, which has the shape of a hollow cylinder and is intended to be connected to a shaft 5 of an electrical rotating machine 1 in a force-fitting manner, wherein the motion sensor 7 is separated from the sensor ring 8 by an air gap 9. In order to achieve a greater degree of reliability at high rotational speeds and ratings compared with the prior art, it is suggested that the sensor ring 8 has a carrier ring 11 composed of a first material 13 and a sensor target 12 composed of a second material 14.

What is claimed is:

1. A sensor apparatus for a magnetic bearing apparatus, said sensor apparatus comprising:
   a sensor ring having a shape of a hollow cylinder and comprising a carrier ring made of a first material and connected to a shaft of an electrical rotating machine in a force-fitting manner; and a sensor target made of a second material and disposed along an outer circumference of the carrier ring, said second material having a permeability which is lower than a permeability of the first material, and
   a motion sensor separated from the sensor ring by an air gap.

2. The sensor apparatus of claim 1, wherein the second material of the sensor target is connected to the first material of the carrier ring by a cohesive connection and/or positive-fitting connection.

3. The sensor apparatus of claim 1, wherein the second material of the sensor target is connected to the first material on a radial outer side of the carrier ring.

4. The sensor apparatus of claim 1, wherein the carrier ring has a radial outer side formed with a cavity, said cavity being filled with the second material of the sensor target.

5. The sensor apparatus of claim 4, wherein the cavity has a width which tapers radially outwards.

6. The sensor apparatus of claim 1, wherein the first material of the carrier ring has a mechanical strength which is greater than a mechanical strength of the second material of the sensor target.

7. The sensor apparatus of claim 1, wherein the first material of the carrier ring is a high-strength steel.

8. The sensor apparatus of claim 1, wherein the second material of the sensor target is a paramagnetic stainless steel.

9. An electrical rotating machine, comprising:
   a rotor configured for rotation about an axis of rotation;
   a stator disposed in surrounding relation to the rotor; and
   a magnetic bearing apparatus comprising a sensor apparatus which includes a sensor ring having a shape of a hollow cylinder and comprising a carrier ring made of a first material and connected to a shaft of an electrical rotating machine in a force-fitting manner; and a sensor target made of a second material and disposed along an outer circumference of the carrier ring, said second material having a permeability which is lower than a permeability of the first material, and a motion sensor separated from the sensor ring by an air gap.

10. The electrical rotating apparatus of claim 9, wherein the second material of the sensor target is connected to the first material of the carrier ring by a cohesive connection and/or positive-fitting connection.

11. The electrical rotating apparatus of claim 9, wherein the second material of the sensor target is connected to the first material on a radial outer side of the carrier ring.

12. The electrical rotating apparatus of claim 9, wherein the carrier ring has a radial outer side formed with a cavity, said cavity being filled with the second material of the sensor target.

13. The electrical rotating apparatus of claim 12, wherein the cavity has a width which tapers radially outwards.

14. The electrical rotating apparatus of claim 9, wherein the first material of the carrier ring has a mechanical strength which is greater than a mechanical strength of the second material of the sensor target.

15. The electrical rotating apparatus of claim 9, wherein the first material of the carrier ring is a high-strength steel.

16. The electrical rotating apparatus of claim 9, wherein the second material of the sensor target is a paramagnetic stainless steel.

17. A method for producing a sensor apparatus, comprising:
producing a carrier ring made of a first material;
applying a sensor target, which is made of a second material having a permeability that is lower than a permeability of the first material of the carrier ring, along an outer circumference of the carrier ring;
connecting the sensor target to the carrier ring to form a sensor ring, and
arranging a motion sensor separated from the sensor ring by an air gap.

18. The method of claim 17, further comprising connecting the second material of the sensor target to the first material of the carrier ring by a cohesive connection.

19. The method of claim 18, wherein the cohesive connection is established by overlay welding or diffusion welding.

20. The method of claim 19, wherein, during the diffusion welding, nickel is used as the diffusion material.

21. The method of claim 17, further comprising:
forming a cavity on a radial outer side of the carrier ring during production of the carrier ring;
inserting the sensor target into the cavity of the carrier ring and connecting the sensor target to the carrier ring.

22. The method of claim 21, wherein the cavity has a width which tapers radially outwards.

* * * * *

UNITED STATES PATENT AND TRADEMARK OFFICE
CERTIFICATE OF CORRECTION

| | | |
|---|---|---|
| PATENT NO. | : 10,823,585 B2 | Page 1 of 1 |
| APPLICATION NO. | : 16/075076 | |
| DATED | : November 3, 2020 | |
| INVENTOR(S) | : Benjamin Gottfried Ulbrich and Martin Wieschalla | |

It is certified that error appears in the above-identified patent and that said Letters Patent is hereby corrected as shown below:

On the Title Page

Under (30) Foreign Application Priority Data:
Replace "EP 16154042" with the correct -- EP 16154042.2 --

Under (56) OTHER PUBLICATIONS:
Add: "Nondestructive Examination"; Northwestern Polytechnical University Press; August 31, 2015; pages 62 and 63

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*